United States Patent
Woods (12)

(10) Patent No.: US 6,379,765 B1
(45) Date of Patent: *Apr. 30, 2002

(54) FRAMING DEVICE FOR DISPLAYING PHOTOGRAPHS, CERTIFICATES AND OTHER SHEET-LIKE MATERIAL

(75) Inventor: Carey P. Woods, Plum City, WI (US)

(73) Assignee: Richard S. Werner, West Bend, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,981

(22) Filed: Sep. 14, 1998

(51) Int. Cl.$^7$ ................................................. A47G 1/06
(52) U.S. Cl. ........................ 428/40.1; 40/702; 40/709; 40/722; 40/737; 40/771; 40/775; 40/776; 428/13; 428/14; 428/41.7; 428/418; 428/194
(58) Field of Search .................. 428/13, 14, 40.1, 428/41.7, 42.1, 41.8, 194; 40/776, 775, 702, 709, 722, 771, 737

(56) References Cited

U.S. PATENT DOCUMENTS

| | | | | |
|---|---|---|---|---|
| 4,393,612 A | * | 7/1983 | Clark | 40/776 |
| 4,413,434 A | * | 11/1983 | Rupert | 40/776 |
| 5,025,581 A | * | 6/1991 | Polzin | 40/159 |
| 5,533,288 A | * | 7/1996 | Lambert | 40/773 |

* cited by examiner

Primary Examiner—Nasser Ahmad
(74) Attorney, Agent, or Firm—Jansson, Shupe & Munger, LTD

(57) ABSTRACT

A framing device, used for displaying items such as photographs, certificates and the like, includes a translucent sheet-like material having an outward side and an inward side, both having a common continuous edge. An adhesive is applied along the inward side adjacent to the continuous edge in such a manner that a portion of such edge remains adhesive-free. A sheet of backing material has a first side and a second side and the first side of such foam is positionally secured by the adhesive and with respect to the translucent material. And a release liner is attached to the second side of the backing material. The adhesive-free portion of the edge and the sheet of backing material define a slot permitting insertion and removal of an item to be displayed.

30 Claims, 4 Drawing Sheets

FRAMING DEVICE FOR DISPLAYING PHOTOGRAPHS, CERTIFICATES AND OTHER SHEET-LIKE MATERIAL

SUMMARY OF INVENTION

This invention relates generally to card, picture and sign exhibiting and, more particularly to a device and method for framing articles such as photographs, certificates and the like.

BACKGROUND OF INVENTION

People are always searching for ways to appropriately display articles such as pictures, photographs and certificates of award or recognition. For documents signifying important milestones such high school or college graduation, the attainment of professional license, or the attainment of significant recognition, expensive framing such as the traditional picture frame that is used for the wall mounting of articles is employed. Such framing is also used to display pictures such as graduation or wedding photos.

This type of traditional framing is expensive and usually involves rigid three-dimensional structures that require some form of hooking device mounted on the wall working in tandem with a wire or protrusion attached to the back of the frame in order to hang the frame on to the surface of a wall. Another type of framing device utilizes a brace that extends from the back of the frame, thereby allowing the frame to stand on a level surface such as a desk or table top.

For certain needs, a shortcoming of both of these framing devices is that their relative cost prevents them from being widely used to display informal candid photographs of people, pets, or scenery taken during parties, vacations, or everyday occurrences. Many such photographs are displayed on a refrigerator, filing cabinet or locker using a magnet. Such method of display offers no form of protection for the article—nor is it particularly attractive aesthetically. This lack of protection results, in many cases, in some type of disfigurement of the displayed article, either in the form of torn or curled edges or damage to the face of the article.

Another form of informal display involves putting the article beneath a glass table or desk top or the clear cover sheet of a desk blotter. Such display is limited in that the article is usually visible only to the person sitting behind the desk or table.

Other types of inexpensive framing devices employ smooth, static cling film, tacks or tape to secure a photograph to a flat surface such as a wall. While inexpensive, tape or static cling film have a shortcoming in that either can lose its mounting properties over time. Also, when an adhesive is used, the adhesive may either leave a residue on or mar the mounting surface once the framing device is removed. Additionally, the static cling film can be difficult to work with in that it can bunch up and stick to itself, thereby making mounting difficult. And a framing device made with such film is not very sturdy and, therefore, not ideally suited for long-term use.

Still another inexpensive framing device is sold under the Magnetic FREEZ.A.FRAME™ name. Such device uses a smooth backing having magnetic properties. The display side of the magnetic backing is imprinted around the edges with some message such as "My Birthday," "Friends." or "I Love You." A clear protective sheet is heat sealed to the edges of the display side of the magnetic backing in such a manner that one of the edges remains open so that the photograph to be displayed can be slid in between the protective sheet and the backing. In addition to being sealed along the edges, the protective sheet is heat sealed on three sides at a position between the edge and the center of the backing sheet. This second seal provides a snug fit in which to secure a picture.

Because it utilizes a magnet, the FREEZ.A.FRAME™ device can only be displayed on a metallic surface. In addition, because the border of the FREEZ.A.FRAME™ device is prelabeled with a message for a particular occasion, the device is not "universal" in application; that is, it does not lend itself to use with a variety of types of articles to be displayed.

An easy-to-use framing device and method for making such a device that addresses problems and shortcomings of earlier framing devices and methods would be an important advance in the art.

OBJECTS OF THE INVENTION

An object of the invention is to provide an improved framing device for photographs, certificates and the like that overcomes some of the problems and shortcomings of the prior art.

Another object of the invention is to provide an improved framing device for photographs, certificates and the like that is durable yet inexpensive.

Still another object of the invention is to provide an improved framing device for photographs, certificates and the like that is capable of adhering to a variety of metal and non-metal surfaces.

Yet another object of the invention is to provide an improved framing device for photographs, certificates and the like that is capable of being removed from a mounting surface without marring or leaving a residue on the surface.

How these and other objects are accomplished will become apparent from the following descriptions and from the drawings.

SUMMARY OF THE INVENTION

The invention involves an improved framing device for displaying items such as photographs, certificates and the like. The framing device is comprised of a translucent sheet-like material having both an outward side (i.e., a side toward the viewer of an article being displayed in the device) and an inward side toward the article. Both sides of the sheet-like material are bounded by and have a continuous common edge. An adhesive is applied along the inward side adjacent to the continuous edge in such a manner that at least a portion of the edge remains adhesive-free. That is, the adhesive is "discontinuous" in that it does not extend entirely around the central viewing region through which the article is visible.

A sheet of backing material has a first ("front") side (i.e., a side toward the translucent material and, when an article is displayed, toward such article) and a second ("back") side. At least the back side of such backing material has adherent properties. The sheet of backing material is positioned so that a portion of its first side adheres to the adhesive, thereby fixing the sheet of backing material with respect to the translucent material. A release liner adheres to the second side of the backing material.

The article to be displayed is inserted into the device through a slot defined by the adhesive-free portion of the edge and the sheet of backing material. And, of course, such article may be later removed through such slot.

In one embodiment of the invention, the adherent properties of the backing material result from a coating that is applied to at least its back side.

In another embodiment of the invention, the translucent sheet-like material has a frame imprinted on one of its sides. In still another embodiment, the first side of the backing material is treated with polypropylene so as to allow the displayed item to slide more easily between the backing material and the translucent sheet-like material. In the more preferred embodiment of the invention, the combined thickness of the sheet of backing material and the layer of polypropylene is no more than 29 mils.

In another preferred embodiment of the invention, the translucent sheet-like material includes a central viewing region, and the adhesive extends away from the continuous edge of the sheet-like material toward the viewing region by a dimension of approximately ½". In a more preferred embodiment, the translucent sheet-like material has a thickness no greater than 10 mils. In such an embodiment, the adhesive applied to the translucent sheet-like material forms a layer that, most preferably, is no more than 10 mils. thick.

A method for making a device for framing photographs, certificates and the like includes the steps of printing, on a sheet of translucent material having an outward side and an inward side, a frame pattern on one of the sides. While extremely thin (when applied by, e.g., silk screen printing), such frame pattern gives or can give the visual impression of a frame having substantially greater thickness.

A discontinuous layer of adhesive is applied to the inward side of the translucent material. That is, the layer of adhesive does not extend entirely around the edge of the translucent material or, in the case of "gang-manufactured" devices, around that portion of the translucent material which will form such edge in the finished device.

A sheet of backing material is adhered to the adhesive and substantially simultaneously, the translucent material and the backing material are cut into a desired shape, e.g., a rectangular or oval framing device.

In a more specific aspect of the method, the adhering step is preceded by the step of treating the first side of the backing material by the application of a substantially tack-free material. In another, more specific aspect of the method, the adhering step is preceded by the step of placing a release liner against the sheet of backing material. Most preferably, treating and release liner placement are both used and a highly preferred treating material is polypropylene sheet or "laminate" applied to the first side of the backing material.

There is no reason why the new device cannot be made "one at a time." However, a highly preferred aspect of the method results in a number of devices made substantially simultaneously. In such aspect, the printing step includes printing a plurality of frame patterns, and the applying step includes applying a plurality of discontinuous layers of adhesive to the inward side. The adhering step includes adhering a sheet of backing material to each of the plurality of discontinuous layers of adhesive, and the cutting step includes cutting, substantially simultaneously, the translucent material and the backing material into a plurality of desired shapes. The plurality of desired shapes may be substantially identical to one another or may differ.

Further details of the invention are set forth in the following detailed description and in the drawings.

DETAILED DESCRIPTION OF PREFERRED EMBODIMENTS

Figure 1:
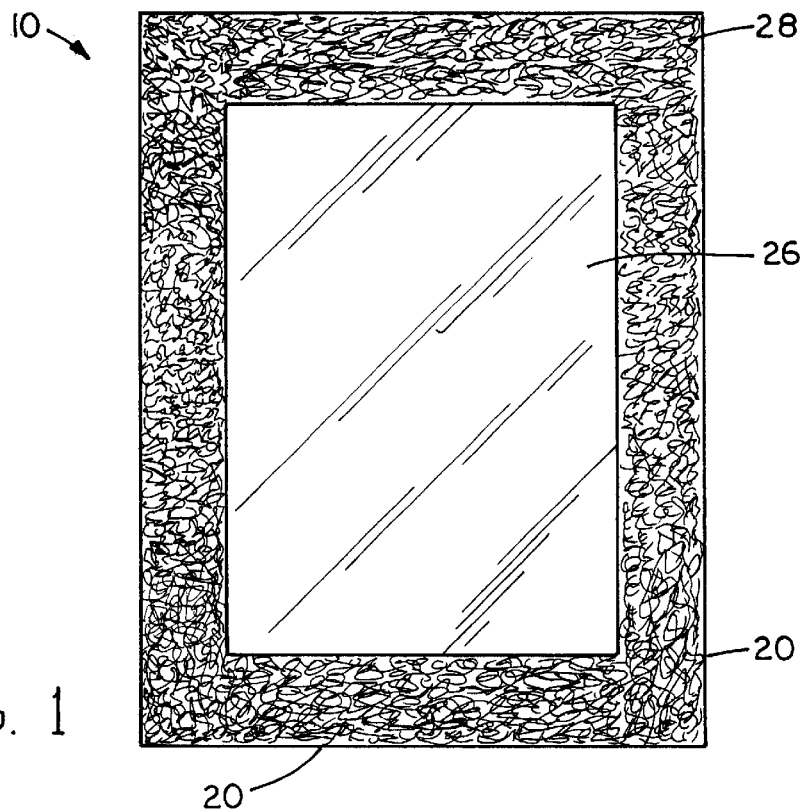
FIG. 1 is a front view of the framing device showing the outward side of the translucent material including a frame and the central viewing region.

The invention, as shown in FIGS. 1, 3, 4 and 7, involves an improved framing device 10 for displaying items such as photographs, certificates and the like. The framing device 10 is comprised of a translucent sheet-like material 12 having both an outward side 14 that will be toward the viewer and a reverse or inward side 16 toward a sheet of resilient, foam-like backing material 18. When an article such as a photo, certificate or the like (not shown) is mounted in the device 10, the inward side 16 is also toward the article. Both sides 14, 16 of the sheet-like material 12 have a common continuous edge 20.

Figure 2:
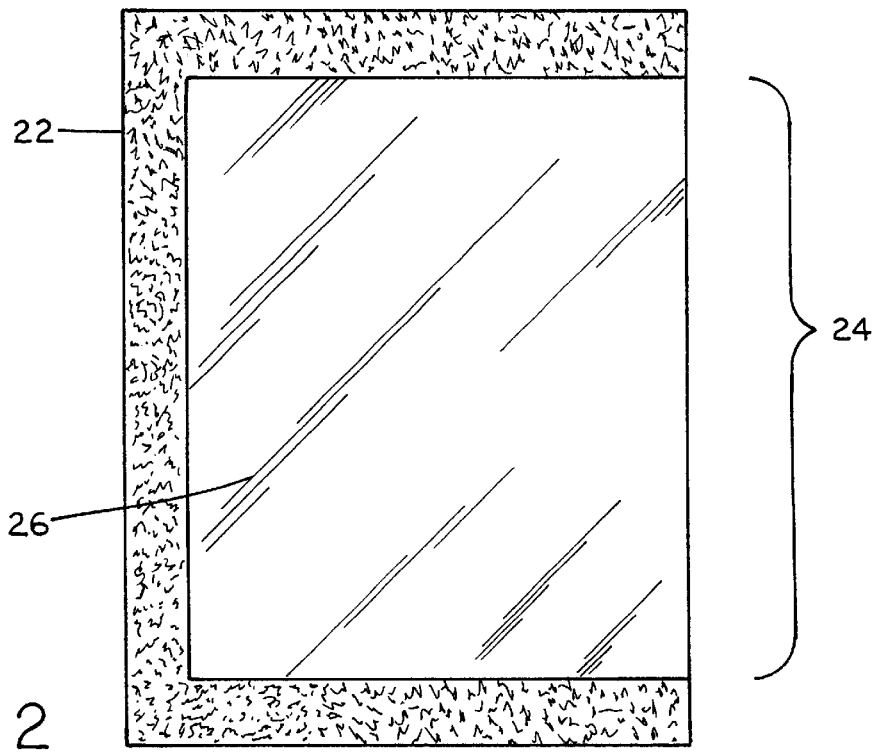
FIG. 2 is a rear view of the framing device showing the inward side of the translucent material including adhesive and the central viewing region.
Figure 3:
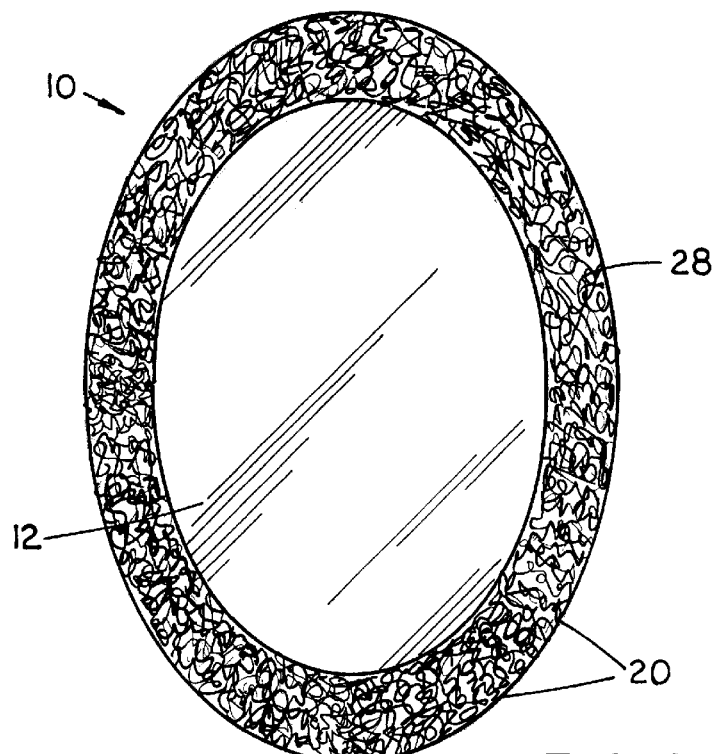
FIG. 3 is a front view of the framing device showing the device in a circular shape.
Figure 4:
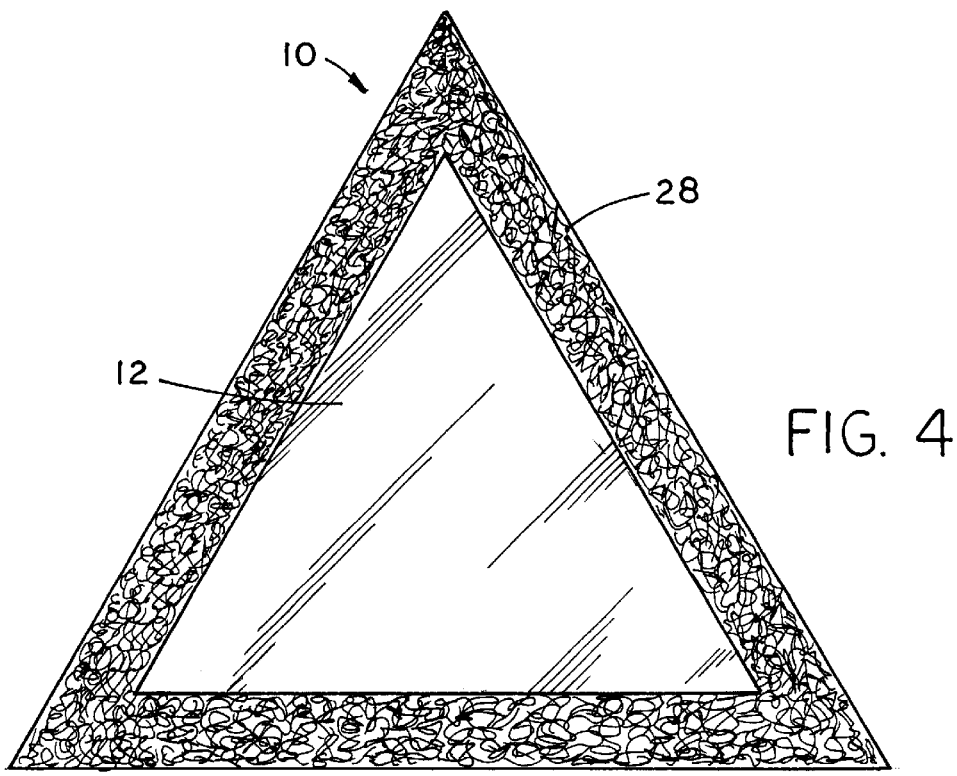
FIG. 4 is a front view of the framing device showing the device in a triangular shape.

As shown in FIGS. 1, 3 and 4, such sheet-like material 12 can be in the form of any of the various geometrical shapes such as a circle, oval, triangle, square and rectangle. An adhesive 22 is discontinuously applied along the inward side 16 of the sheet-like material 12 adjacent to the continuous edge 20, as shown in FIG. 2. That is, there is a gap 24 or discontinuity in the adhesive 22 so that a portion along the edge 20 is adhesive-free.

The translucent sheet-like material 12 includes a central viewing region 26, and the adhesive 22 extends away from the edges 20 of the sheet-like material 12 toward the viewing region 26 by a dimension. Preferably, such dimension is approximately ½ inch (about 1.27 cm) and preferably not more than ½ inch.

Referring also to FIGS. 1, 3, and 4, a highly preferred embodiment of the inventive device 10 includes the "image" of a frame 28 printed on one of the sides 14, 16, of the translucent sheet-like material 12. That is, such frame 28 is very thin, i.e., the thickness of a layer of ink, and can fairly be said to be two-dimensional rather than three-dimensional. But the visual impression resembles that of a three-dimensional frame. Such imprinting can be accomplished using any known methods such as silk screening, printing, painting or the like.

A sheet of backing material 18, preferably shaped to correspond to the geometrical shape of the translucent sheet-like material 12, has a first ("front") side 30 (a side toward the translucent material in the finished device) and a second ("back") side 32. At least the second side 32 of the backing material 18 has adherent properties. A release liner 34 is affixed to such second side 32. The sheet of backing material 18 is positioned so that a portion of its first side 30 contacts and adheres to the adhesive 22 and so that the edge 36 of such backing material 18 is in registry with the edge 36 of the translucent sheet-like material 12, thereby completing the device 10.

The article to be displayed is inserted through the slot between the translucent sheet-like material 12 and the backing material 18. (As noted above, the slot is defined by the translucent material 12, by the backing material 18 and by the discontinuity in the adhesive 22. Following insertion of the display article, the release liner 34 attached to the second side 32 of the backing material 18 is removed and the device 10 is ready to be affixed to the display surface.

Figure 5:
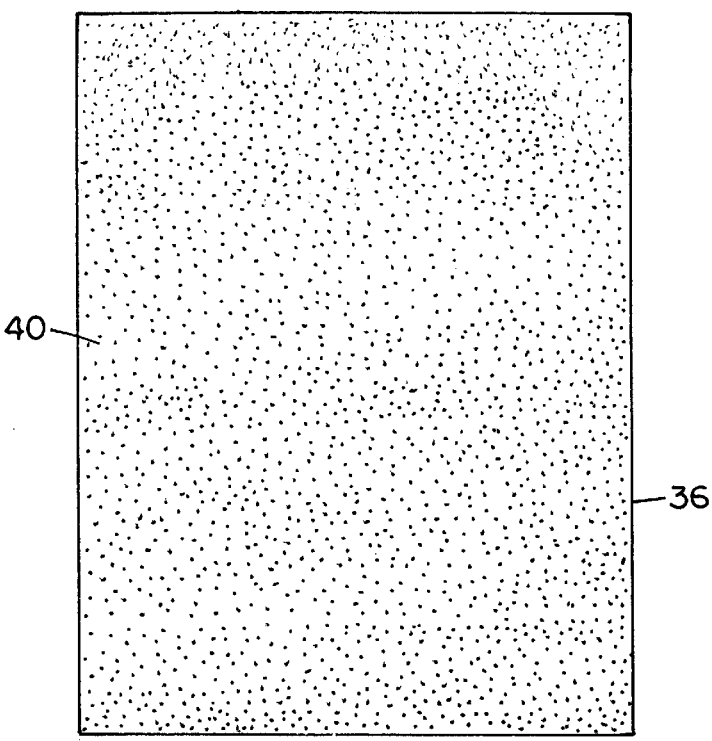
FIG. 5 is a rear view of the backing material showing tactile adhesive surface.

In one embodiment, as shown in FIG. 5, the backing material 18 utilized in the invention has first and second sides 30 and 32, respectively, which are tacky to the touch. In such an embodiment, it is most preferable that the first side 30 of the backing material 18 be treated to make such side substantially tack-free. A preferred way to treat such side is to overlay it with a thin polymeric film. Such treatment allows the displayed article to slide freely between the backing material 18 and the translucent sheet-like material 12.

In another embodiment of the invention, only the second side 32 of the backing material 18 has adherent properties and such properties result from a tacky coating that is applied to at least its back side 32.

Figure 6:
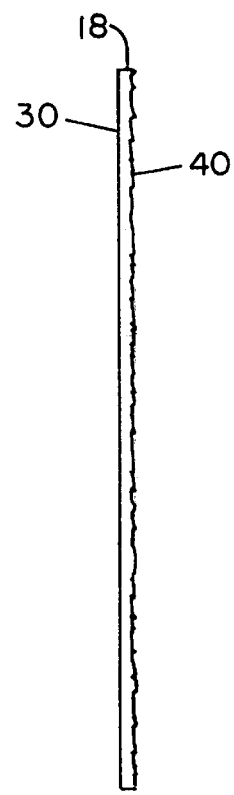
FIG. 6 is a side view of the backing material showing a treated front side of the backing material and back side having a tactile adhesive surface.
Figure 7:
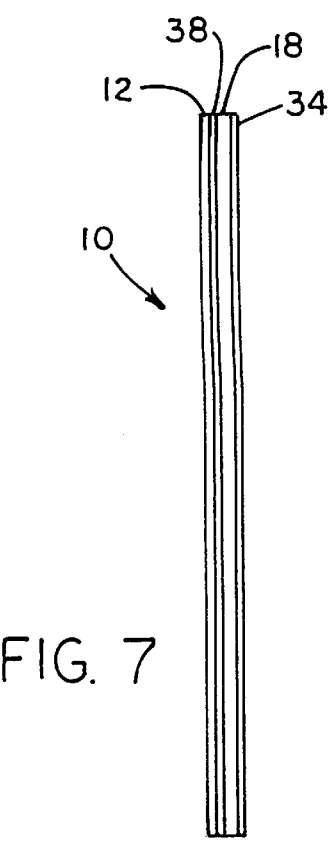
FIG. 7 is a side view of the framing device.
Figure 8:
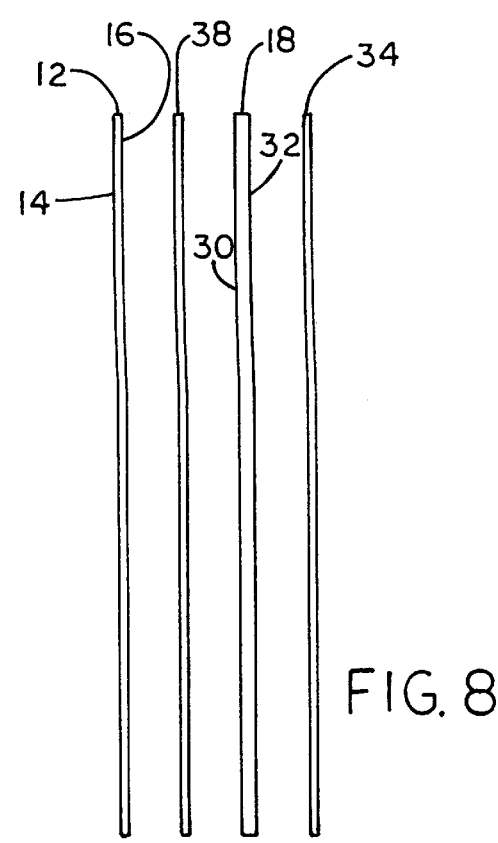
FIG. 8 is an exploded side view of the framing device.
Figure 9:
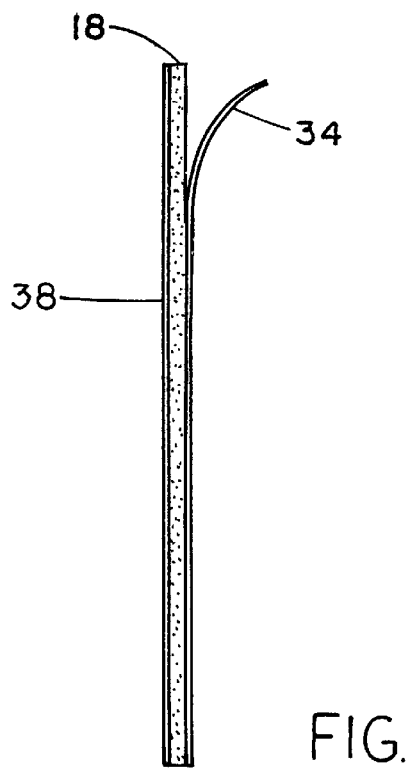
FIG. 9 is a side view of the backing material showing the release liner being removed from the back side.
Figure 10:
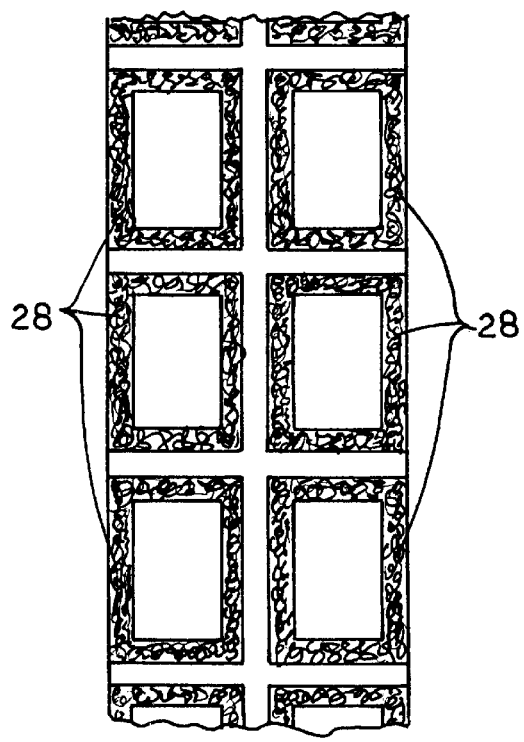
FIG. 10 is a front view of a sheet of translucent material showing a preprinted frame pattern.
Figure 11:
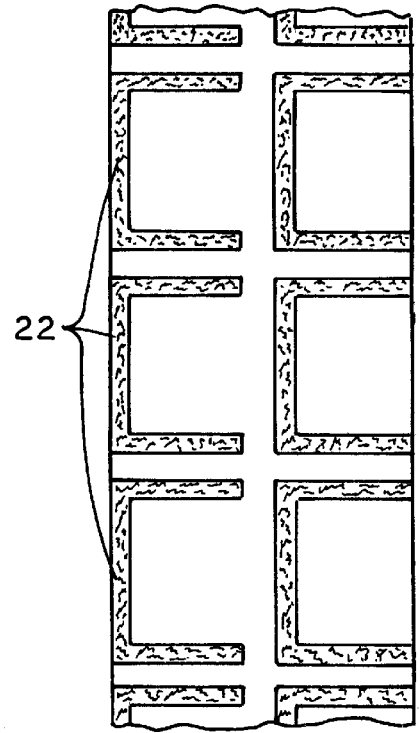
FIG. 11 is a rear view of a sheet of translucent material showing a preapplied adhesive layer.

In several embodiments of the invention, at least the second side 32 of the backing material 18 is, tactilely, slightly textured as represented in FIGS. 5 and 6. This is in contrast to, say, backing material and other sheet plastic materials which are glassy-smooth to the touch. When the release liner 34 is removed from the second side 32, the exposed tacky surface is capable of adhering to any one of several types of surfaces such as glass, metal or wood. A feature of the backing material 18 utilized in one embodiment contributing to the ability of the device 10 to adhere to a wide variety of surfaces is its compressibility.

Referring now to FIGS. 8, 9, 10 and 11, a method for making the device 10 will now be described. There is no reason why the new device 10 cannot be made "one at a time." However, a highly preferred aspect of the method results in a number of devices 10 made substantially simultaneously.

Understanding of the following description will be aided by the following definitions. Translucent material in sheet form has a length and width selected to accommodate the manufacture of several devices 10 therefrom. Sheet-form translucent material 12 is typically provided in the form of a stack of flat sheets, one atop the other.

Backing material 18 in sheet form also has a length and width selected to accommodate the manufacture of several devices 10. Such backing sheet 18 can be made from various materials such as foam or some other types of polymers.

Translucent material in web form is provided in a roll of fixed width and indeterminate length. Using the entire length of the web accommodates the manufacture of many more devices 10 than is possible from a single sheet. In this specification, "sheet" is used, as described above, to denote either sheet-form or web-form material or foam.

A frame pattern 28, and preferably, several frame patterns 28 are printed on one of the sides 14 or 16 of the sheet of material 12. A discontinuous layer of adhesive 22 is applied to the inward side 16 of such material. That is, the layer of adhesive 22 does not extend entirely around the edge 20 of the translucent material 12 or, in the case of "gang-manufactured" devices, around that portion of the translucent material 12 which will form such edge 20 in the finished device.

A sheet of backing material 18 is then adhered to the adhesive 22. Substantially simultaneously, the translucent material 12 and the backing material 18 are cut into the desired shape(s), e.g., rectangular or oval framing device(s), by using a cutting die or cutting wheels.

In a more specific aspect of the method, the adhering step is preceded by the step of treating the first side 30 of the backing material 18 to be substantially tack-free, preferably by applying a substantially tack-free material. In another, more specific aspect of the method, the adhering step is preceded by the step of placing a release liner 34 against the sheet of backing material 18. Most preferably, treating and release liner 34 placement are both used and a highly preferred treating material is polypropylene sheet or "laminate" applied to the first side 30 of the backing material 18.

When gang-manufacturing the device 10, the printing step includes printing a plurality of frame patterns 28, and the applying step includes applying a plurality of discontinuous layers of adhesive 22 to the inward side 16. The adhering step includes adhering a sheet of backing material 18 to each of the plurality of discontinuous layers of adhesive 22, and the cutting step includes cutting, substantially simultaneously, the translucent material 12 and the backing material 18 into a plurality of desired shapes. The plurality of desired shapes may be substantially identical to one another or may differ.

Characteristics of preferred materials will now be described. In one embodiment, the backing material 18 is a cling foam. The free (uncompressed) thickness of the cling foam preferably ranges from about 1/64 inch (about 0.4 mm) to about ¼ inch (about 6.35 mm). The free thickness of highly preferred cling foam is about 1/32 inch (about 0.79 mm) thick, is natural in color and has a density of about 20 pounds (about 9 kg). Density of the cling foam increases with decreasing thickness.

A highly preferred material to treat the first side 30 of the cling foam to make it substantially tack-free is polypropylene sheet about 0.75 mil (about 0.002 cm) thick. Such material is preferably coated with WC-3 acrylic PSA adhesive. It should be appreciated that a wide variety of treating materials can be used. In the more preferred embodiment of the invention, the combined thickness of the sheet of cling foam and the layer of polypropylene is no more than 29 mils. (about 0.073 cm.).

Preferred translucent material includes polypropylene, polyester, poly vinyl chloride (PVC), styrene and polycarbonate. Such material is preferably treated to accept printing. Translucent material having a thickness in the range of 10 mil. to 50 mil. (about 0.025 cm to about 0.13 cm) is preferred with about 10 mil. thickness being highly preferred.

Preferred adhesives include liquid adhesive, pressure-sensitive double coated tape, hot melt glue, and heat activated adhesive. Preferred thickness of such adhesive is from about 0.5 mil. to about 15 mil. (about 0.0013 cm. to about 0.04 cm.).

Preferred release liners include plastic film or paper with a thickness of from 0.5 mil. to about 20 mil. (about 0.0013 cm. to about 0.05 cm.). A more preferred liner is silicone coated paper about 7.5 mil. (about 0.02 cm.) thick.

As used herein and when referring to the sheet-like material, the term "translucent" means that the material will pass light therethrough with some attenuation or with little or no attenuation. In the former instance, such material might aptly be referred to as "frosted" or "clouded" while in the latter instance, the material would be considered "clear."

The term "tack-free" means that the treated component or the product used to treat such component is not tacky or sticky to the touch.

While the principles of the invention have been shown and described in connection with but a few embodiments, it is to be understood clearly that such embodiments are by way of example and are not limiting.

What is claimed:

1. A framing device for displaying photographs, certificates and similar planar items, comprising:
    a sheet of translucent material having outward and inward sides with a common continuous outer edge and forming the outermost layer of the device, the outward side forming the outermost surface of the device, the outermost surface extending substantially continuously and completely from edge to edge in substantially a single plane;
    an adhesive along the inward side adjacent to the continuous edge in a manner leaving a portion of the edge adhesive-free;
    a sheet of flexible backing material having front and back sides, at least the back side having adherent properties and the front side being secured to the sheet of translucent material by the adhesive;
    a release liner attached to the back side of the sheet of backing material; and wherein:
        the adhesive-free portion of the edge and the backing material define a slot for insertion and removal of an item to be displayed; and
        the back side of the sheet of backing material is capable of adhering in a removable and replaceable manner to a display surface.

2. The framing device of claim 1 wherein the translucent material has a frame imprinted on one of its sides.

3. The framing device of claim 1 wherein the front side of the sheet of backing material is substantially tack-free.

4. The framing device of claim 3 wherein the front side of the sheet of backing material includes a sheet of adhesive-free plastic material adhering thereto.

5. The framing device of claim 1 wherein the sheet of backing material is made of foam.

6. The framing device of claim 1 wherein:
    the sheet of translucent material includes a central viewing region; and
    the adhesive extends away from the continuous edge toward the viewing region by a dimension of approximately ½ inch.

7. The framing device of claim 1 wherein the translucent material has a thickness no greater than 10 mils.

8. The framing device of claim 7 wherein the adhesive applied to the translucent material forms a layer no more than 10 mils. thick.

9. The framing device of claim 3 wherein:
    the sheet of backing material has a thickness;
    the front side of the sheet of backing material is treated by applying a sheet of polypropylene thereto; and
    the combined thickness of the sheet of backing material and the sheet of polypropylene is no more than 29 mils.

10. The framing device of claim 1 wherein the device has a circular shape.

11. The framing device of claim 1 wherein the device has a triangular shape.

12. The framing device of claim 1 wherein the device has a square shape.

13. The framing device of claim 1 wherein the device has a rectangular shape.

14. A framing device of claim 1 wherein the adherent properties result from a coating that is applied to at least the back side of the sheet of backing material.

15. The framing device of claim 14 wherein the translucent material has a frame imprinted on one of its sides.

16. The framing device of claim 14 wherein the front side of the sheet of backing material is treated to be substantially tack-free.

17. The framing device of claim 16 wherein the front side of the sheet of backing material includes a sheet of adhesive-free plastic material adhering thereto.

18. The framing device of claim 14 wherein the sheet of backing material is made of foam.

19. The framing device of claim 14 wherein:
    the sheet of translucent material includes a central viewing region; and
    the adhesive extends away from the continuous edge toward the viewing region by a dimension of approximately ½ inch.

20. The framing device of claim 14 wherein the translucent material has a thickness no greater than 10 mils.

21. The framing device of claim 20 wherein the adhesive applied to the translucent material forms a layer no more than 10 mils. thick.

22. The framing device of claim 16 wherein:
    the sheet of coated backing material has a thickness;
    the front side of the sheet of coated backing material is treated by applying a sheet of polypropylene thereto; and
    the combined thickness of the sheet of coated backing material and the sheet of polypropylene is no more than 29 mils.

23. The framing device of claim 14 wherein the device has a circular shape.

24. The framing device of claim 14 wherein the device has a triangular shape.

25. The framing device of claim 14 wherein the device has a square shape.

26. The framing device of claim 14 wherein the device has a rectangular shape.

27. A framing device for displaying photographs, certificates and similar items, comprising:
    a sheet of translucent material having outward and inward sides and a common continuous edge, the sheet of translucent material extending substantially from edge to edge so as to form the outermost layer of the device;
    an adhesive along the inward side adjacent to the continuous edge in a manner leaving a portion of the edge adhesive-free;
    a sheet of flexible backing material having front and back sides, at least the back side having adherent properties and the front side being secured to the sheet of translucent material by the adhesive, the sheet of backing material being made of foam;
    a release liner attached to the back side of the sheet of backing material;
    and wherein:
        the adhesive-free portion of the edge and the backing material define a slot for insertion and removal of an item to be displayed; and
        the back side of the sheet of backing material is capable of adhering in a removable and replaceable manner to a display surface.

28. A framing device for displaying photographs, certificates and similar items, comprising:

a sheet of translucent material having outward and inward sides and a common continuous edge, the sheet of translucent material extending substantially from edge to edge so as to form the outermost layer of the device;

an adhesive along the inward side adjacent to the continuous edge in a manner leaving a portion of the edge adhesive-free;

a flexible backing sheet having front and back sides, the back side having adherent properties and the front side being substantially tack-free by virtue of the flexible backing sheet's inclusion of a front-side ply of polypropylene, the flexible backing sheet having a thickness of no more than 29 mils, the front side being secured to the sheet of translucent material by the adhesive;

a release liner attached to the back side of the flexible backing sheet;

and wherein:

the adhesive-free portion of the edge and the flexible backing sheet defining a slot for insertion and removal of an item to be displayed; and the back side of the flexible backing sheet is capable of adhering in a removable and replaceable manner to a display surface.

29. A framing device for displaying photographs, certificates and similar items, comprising:

a sheet of translucent material having outward and inward sides and a common continuous edge, the sheet of translucent material extending substantially from edge to edge so as to form the outermost layer of the device;

an adhesive along the inward side adjacent to the continuous edge in a manner leaving a portion of the edge adhesive-free;

a sheet of flexible backing material having front and back sides, at least the back side having adherent properties by virtue of a coating applied thereto and the front side being secured to the sheet of translucent material by the adhesive, the sheet of backing material being made of foam;

a release liner attached to the back side of the sheet of backing material;

and wherein:

the adhesive-free portion of the edge and the backing material define a slot for insertion and removal of an item to be displayed; and the back side of the sheet of backing material is capable of adhering in a removable and replaceable manner to a display surface.

30. A framing device for displaying photographs, certificates and similar items, comprising:

a sheet of translucent material having outward and inward sides and a common continuous edge, the sheet of translucent material extending substantially from edge to edge so as to form the outermost layer of the device;

an adhesive along the inward side adjacent to the continuous edge in a manner leaving a portion of the edge adhesive-free;

a flexible backing sheet having front and back sides, the back side having adherent properties by virtue of a coating applied thereto and the front side being substantially tack-free by virtue of the flexible backing sheet's inclusion of a front-side ply of polypropylene, the flexible backing sheet having a thickness of no more than 29 mils, the front side being secured to the sheet of translucent material by the adhesive;

a release liner attached to the back side of the flexible backing sheet;

and wherein:

the adhesive-free portion of the edge and the flexible backing sheet defining a slot for insertion and removal of an item to be displayed; and the back side of the flexible backing sheet is capable of adhering in a removable and replaceable manner to a display surface.

* * * * *